US006836720B2

(12) United States Patent
Hartzheim (10) Patent No.: US 6,836,720 B2
(45) Date of Patent: Dec. 28, 2004

(54) OFFLOAD CONTROL OF TURBOALTERNATOR WITH RICH BURN QUICK QUENCH LEAN BURN COMBUSTOR TO PREVENT BLOWOUT OF COMBUSTOR

(75) Inventor: Anthony A. Hartzheim, Palm Beach, FL (US)

(73) Assignee: Elliott Energy Systems, Inc., Stuart, FL (US)

( * ) Notice: Subject to any disclaimer, the term of this patent is extended or adjusted under 35 U.S.C. 154(b) by 0 days.

(21) Appl. No.: 10/662,060

(22) Filed: Sep. 12, 2003

(65) Prior Publication Data

US 2004/0128053 A1 Jul. 1, 2004

Related U.S. Application Data

(60) Provisional application No. 60/410,404, filed on Sep. 13, 2002.

(51) Int. Cl.[7] ................................. G06F 19/00
(52) U.S. Cl. ......................................... 701/100; 60/773
(58) Field of Search ................................. 701/100, 101; 60/773, 779, 804, 39.091

(56) References Cited

U.S. PATENT DOCUMENTS

| 3,208,218 A | | 9/1965 | Schelin | |
|---|---|---|---|---|
| 3,520,133 A | | 7/1970 | Loft et al. | |
| 4,167,096 A | | 9/1979 | Smith et al. | |
| 5,212,943 A | | 5/1993 | Harris | |
| 5,235,802 A | * | 8/1993 | Barnum et al. | 60/779 |
| 5,581,995 A | * | 12/1996 | Lucenko et al. | 60/779 |
| 6,314,717 B1 | * | 11/2001 | Teets et al. | 60/804 |

* cited by examiner

Primary Examiner—Marthe Y. Marc-Coleman
(74) Attorney, Agent, or Firm—Webb Ziesenheim Logsdon Orkin & Hanson, P.C.

(57) ABSTRACT

A method for operating a gas turbine engine upon the occurrence of an offload condition.

15 Claims, 7 Drawing Sheets

OFFLOAD CONTROL OF TURBOALTERNATOR WITH RICH BURN QUICK QUENCH LEAN BURN COMBUSTOR TO PREVENT BLOWOUT OF COMBUSTOR

CROSS REFERENCE TO RELATED APPLICATION

This application claims the benefit of U.S. Provisional Application Ser. No. 60/410,404, filed Sep. 13, 2002, which is hereby incorporated by reference in its entirety.

BACKGROUND OF THE INVENTION

1. Field of the Invention

The present invention generally relates to the field of gas turbine engines for the generation of electricity and, more particularly, to a method for controlling engine rotor or turbine drive shaft acceleration in an offload condition.

2. Description of Related Art

A turboalternator may be configured as an engine by placing a load on a drive shaft driven by a gas turbine engine. When configured in this manner, the turboalternator supplies mechanical energy to an external device, as well as continues to create electrical energy. Several different control systems are often utilized in starting a gas turbine engine. A typical startup procedure of a gas turbine engine includes the steps of: (1) rotating the engine rotor or turbine drive shaft through the use of an external source until enough compressed air is supplied to the combustion chamber for combustion; (2) combining the energy supplied from the external source with energy created through combustion until the gas turbine engine reaches self-sustaining speed; and (3) further accelerating the gas turbine engine using only energy created through combustion until synchronous speed is reached.

When a turboalternator is configured as an engine, an operator of a turboalternator will typically remove or reduce the load from the drive shaft without shutting down the turboalternator. It is generally desired that the turboalternator continue to operate at a constant speed.

When the load is removed or reduced, the turbine drive shaft will immediately accelerate because of the continuous energy supplied to the turbine drive shaft from combustion within the combustion chamber of the gas turbine engine. A prior art method of controlling the acceleration of a gas turbine engine when a turboalternator is configured to be an engine includes the step of setting the fuel valve to a position that allows very little fuel into the combustion chamber. Controlling the offload acceleration in this manner often results in the loss of combustion in the combustion chamber, typically referred to as blowout, or overheating in the combustion chamber. When blowout occurs, the gas turbine engine must be restarted.

It is, therefore, an object of the present invention to avoid blowouts in the combustion chamber of a gas turbine engine during an offload condition by controlling the acceleration of the turbine drive shaft.

SUMMARY OF THE INVENTION

A method for controlling the speed of a drive shaft of a gas turbine engine during an offload condition utilizes a turbine compressor, an annular combustor, and a control system containing a PID (Proportional Integral Derivative) controller. The annular combustor can include a single fuel source or multiple fuel sources.

Several steps are required prior to operating the gas turbine engine. First, a table of minimum fuel flow rates that will not cause blowout is created. The table's parameters include: (1) rotational speed; and (2) inlet temperature. A function is then created to determine the fuel valve position based on a fuel flow rate accessed from the table. Finally, a variance from synchronous speed must be defined and placed into the control system.

Once all of the necessary variables are defined, a load is placed on the drive shaft of the gas turbine engine and the drive shaft is accelerated to synchronous speed. A sensor can be used to determine when the load is removed. A control system for controlling the speed of the drive shaft during an offload condition is then enabled.

The control system controls the speed of the drive shaft during an offload condition by the following steps: (1) determining if the current speed is within the predefined variance of synchronous speed; (2) exiting the control system if the current speed is within the predefined variance; (3) enabling a PID controller within the control system; (4) requesting a speed for the drive shaft; (5) requesting a fuel valve position based on the requested speed through the PID controller; (6) requesting a fuel flow rate from the table; (7) requesting a fuel valve position through the function; (8) positioning the fuel valve according to the fuel valve position requested through the PID controller if the requested position does not allow less fuel to the combustion chamber than the fuel valve position requested through the function; (9) positioning the fuel valve according to the fuel valve position requested through the function if the fuel valve position requested through the PID allows less fuel through to the combustion chamber than the fuel valve position requested by the function; (10) turning on an ignitor if the fuel valve position used was requested through the function; (11) maintaining the burning of the ignitor until the fuel valve position used is requested through the PID controller; (12) turning off the ignitor if the fuel valve position used is requested through the PID controller; (13) maintaining the ignitor in an off position until the fuel valve position used is requested through the function; and (14) repeating steps 1 through 13 until synchronous speed is reached.

BRIEF DESCRIPTION OF THE DRAWINGS

Additional advantages and features of the invention are explained in greater detail below with reference to the exemplary embodiments illustrated in the accompanying schematic drawings in which like reference symbols identify like parts throughout.

DESCRIPTION OF THE PREFERRED EMBODIMENT

In a gas turbine engine, inlet air from the gas turbine compressor is continuously compressed, mixed with fuel in an inflammable proportion, and then contacted with an ignition source to ignite the mixture, which will then continue to burn. Heat energy is released causing combustion gases to flow across a turbine where it is converted to rotary energy for driving equipment, such as an electrical generator. The combustion gases are then exhausted to the atmosphere. A method for operating a gas turbine engine when operating between self-sustaining speed and synchronous speed occurs in a combustor.

Figure 1:
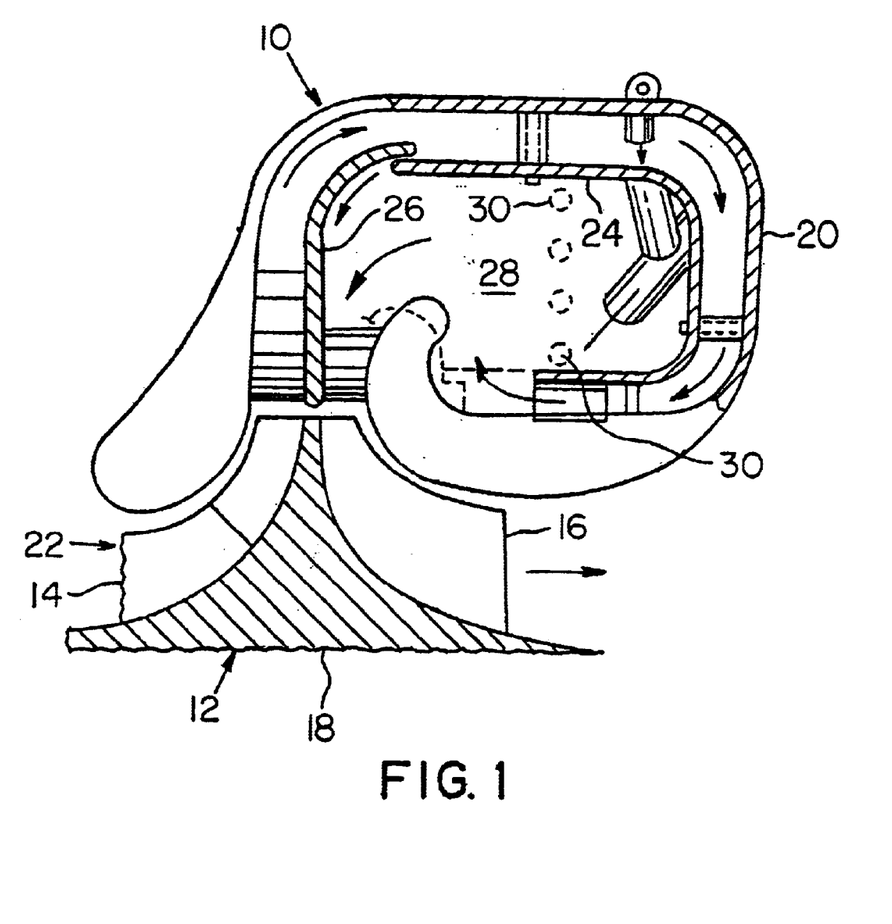
FIG. 1 is a partial section of a portion of an annular combustor.

FIG. 1 shows a partial cross-section of a portion of an annular combustor 10 connected to a turbine engine compressor 12. Engine compressor 12 includes compressor blades 14 and turbine blades 16 positioned around an engine rotor or turbine drive shaft 18.

An annular outer housing wall 20 is provided and defines an air intake passage 22 positioned adjacent compressor blades 14. An outer combustor liner wall 24 and an inner housing wall 26 define an annular combustion chamber 28. The combustion chamber 28 is supplied with a multiple number of fuel orifices 30. The method of the present invention for controlling acceleration upon the occurrence of an offload condition occurs in the combustion chamber 28.

A detailed description of the annular combustor 10 is described in International Application No. WO 98/25082, which is hereby incorporated by reference in its entirety.

Figure 2:
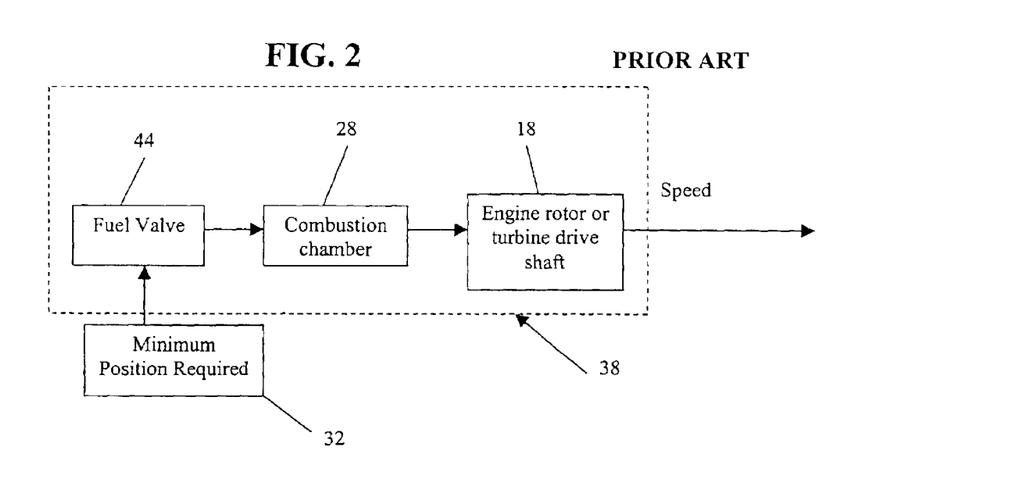
FIG. 2 is a prior art flow diagram of a method of operating a gas turbine engine during an offload condition.

FIG. 2 shows a prior art method for controlling the speed of a turbine drive shaft 18 of a gas turbine engine 38 upon the occurrence of an offload condition. Prior to operating the gas turbine engine 38, a minimum fuel valve position 32 is determined through testing and experimentation. The minimum fuel valve position 32 allows the least amount of fuel possible to the combustion chamber 28 while maintaining combustion. Upon the determination that an offload condition has occurred, the fuel valve 44 is moved to the minimum fuel valve position 32. The decrease in fuel supplied to the combustion chamber 28 decreases the amount of energy supplied to the turbine drive shaft 18. When the system operates properly, the decrease in energy allows the turbine drive shaft 18 to decelerate back to synchronous speed.

However, the turbine drive shaft 18 will often decelerate improperly. In order to maintain combustion within the combustion chamber 28, a ratio of fuel/air must be established. When the fuel valve 44 is set at the minimum fuel valve position 32, the fuel/air ratio can become incorrect because of the decrease in fuel and the increase in compressed air into the combustion chamber 28. An incorrect fuel/air ratio may result in blowout. In other words, the combustion flame in the combustion chamber 28 goes out and combustion ceases to occur. Once blowout occurs, the gas turbine engine 38 must be shutdown and restarted. This results in wasted time, fuel, and resources. Also, if the minimum fuel valve position 32 is set too high, the speed of the turbine drive shaft 18 becomes higher than desired. Once this occurs, it takes longer than desired to decelerate the turbine drive shaft 18 back to synchronous speed.

Figure 3:
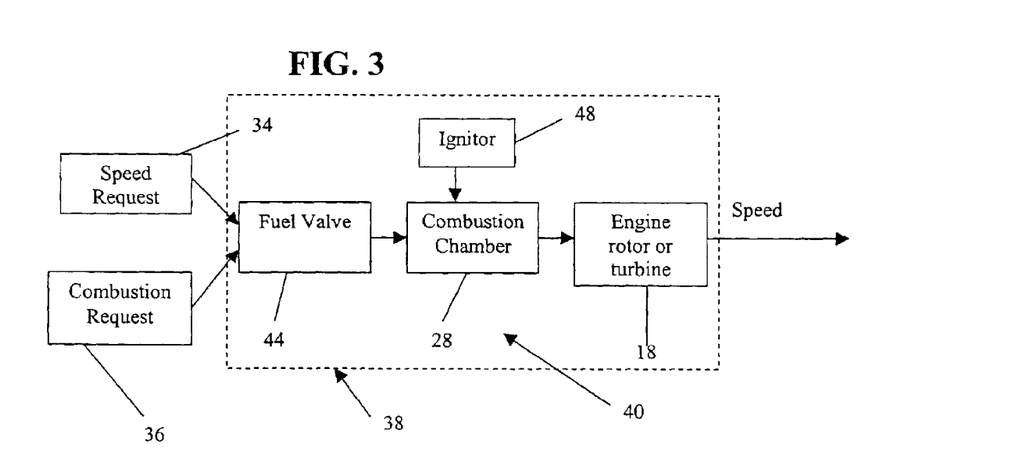
FIG. 3 is a flow diagram of the components of a control system made in accordance with the present invention.
Figure 4:
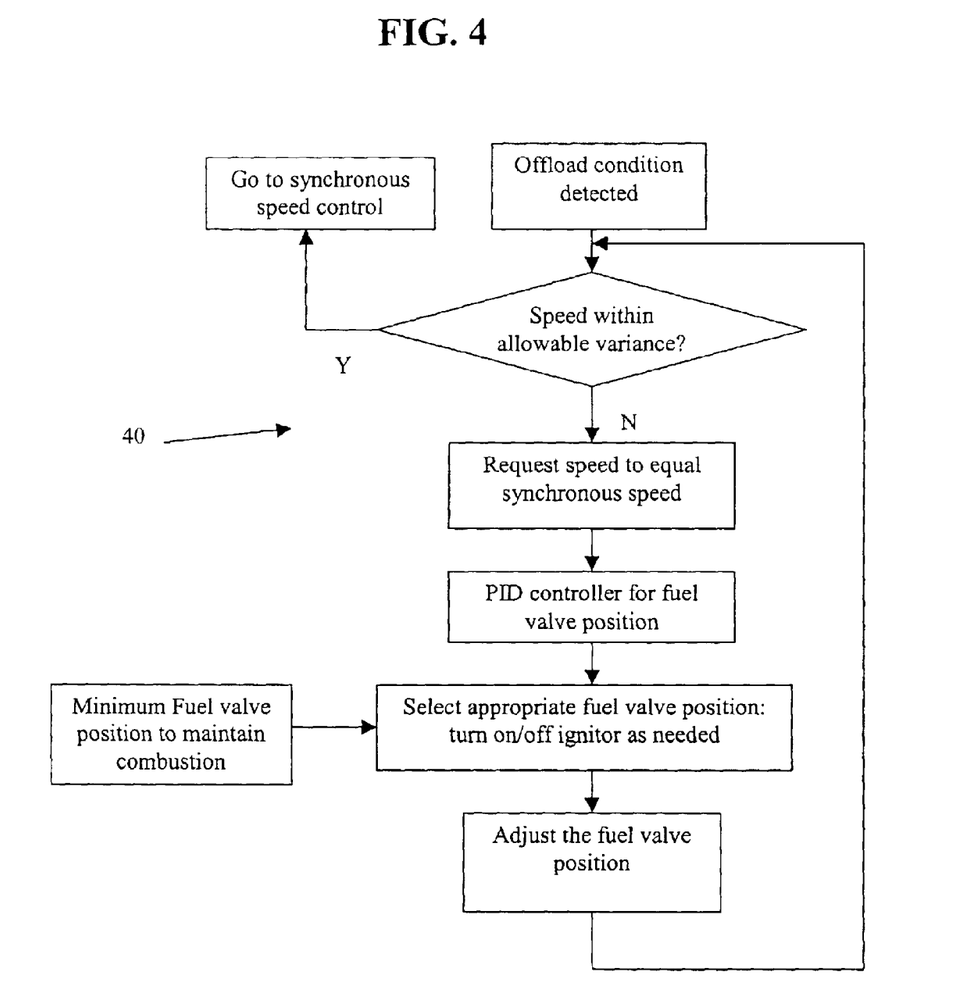
FIG. 4 is a flow diagram of the control logic according to the present invention.

FIGS. 3 and 4 display a method for controlling the speed of a turbine drive shaft 18 of a gas turbine engine 38 upon the occurrence of an offload condition using the method of the present invention. FIG. 3 represents the hardware interactions of the gas turbine engine 38, and FIG. 4 represents a flowchart of the control logic used in a control system 40 of the gas turbine engine 38. Referring to FIG. 3, upon the detection of an offload condition, two fuel valve positions are requested by the control system 40: (1) a position that will achieve a desired turbine drive shaft speed, i.e., speed request 34; and (2) a position which allows the least amount of fuel into the combustion chamber 28 to maintain combustion, i.e., combustion request 36. If the fuel valve 44 is positioned according to the speed request 34, an ignitor 48 will not be turned on by the control system 40. If the speed request 34 will result in blowout, the fuel valve 44 will be positioned by the control system 40, according to the combustion request 36, and the ignitor 48 will be turned on. The ignitor 48 is turned on by the control system 40 to allow the least amount of fuel possible into the combustion chamber 28 while maintaining combustion.

FIG. 4 displays the control logic of the control system 40. First, an offload condition can be sensed via a sensor which causes the control system 40 to determine if the speed of the turbine drive shaft 18 is within a predetermined variance of synchronous speed. By "synchronous speed" is meant the nominal operating speed of the gas turbine engine with or without a load. If the turbine drive shaft 18 is within the predetermined variance, the control system 40 is exited. Otherwise, the control system 40 requests that the speed of the turbine drive shaft 18 be reduced to synchronous speed. A PID controller is then utilized to transform the requested speed into a requested fuel valve position. The control system 40 simultaneously requests a fuel valve position that allows the least amount of fuel into the combustion chamber 28 without causing blowout. A conventional controlling arrangement can adjust the valve position. Referring to FIGS. 3 and 4, if the fuel valve position of the speed request 34 allows less fuel into the combustion chamber 28 than the fuel valve position of the combustion request 36, the combustion request 36 will determine the fuel valve position via an appropriate sensing arrangement, such as with a proximity sensor. Otherwise, the speed request 34 will determine the fuel valve position. If the combustion request 36 is used, the ignitor 48 can be turned on via the control system 40 to avoid blowout. The ignitor 48 can be turned off by the controller once the combustion request is no longer used. The fuel valve 44 can then be adjusted appropriately by the control system 40.

Figure 5:
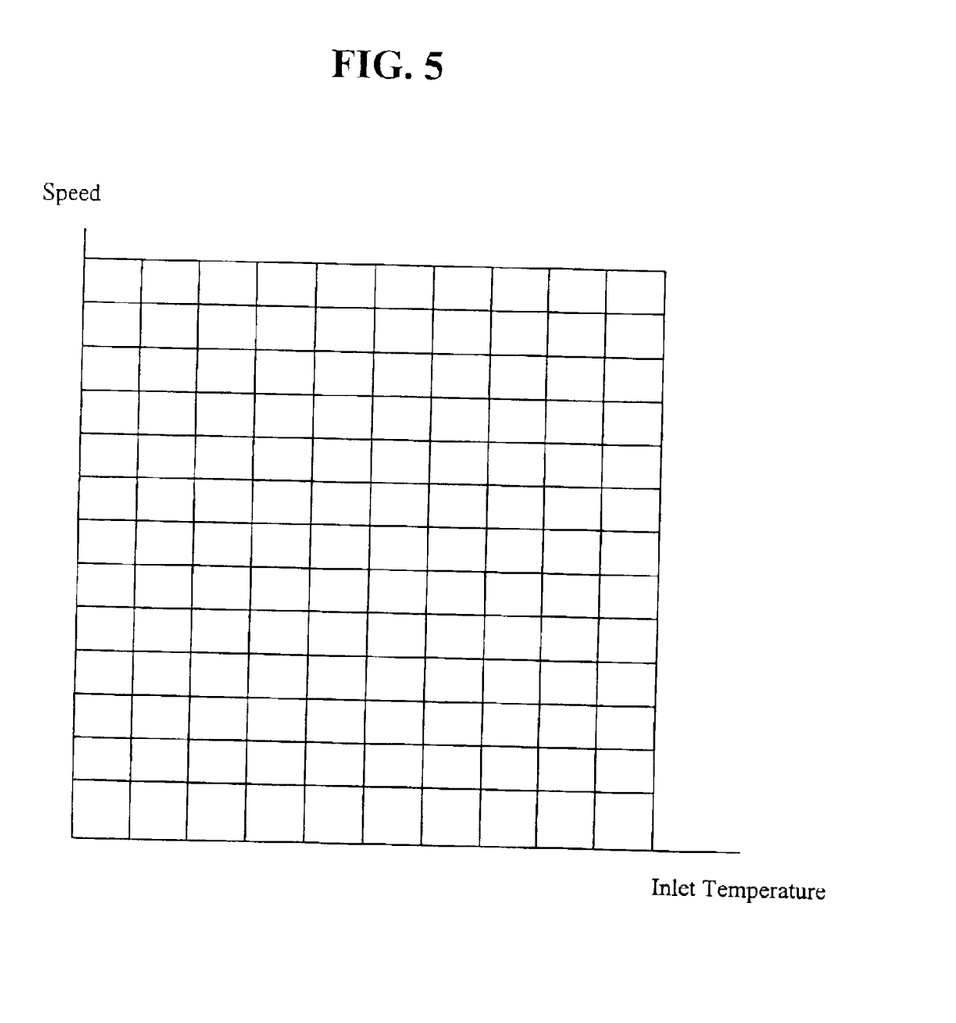
FIG. 5 is a table for determining a required rate of fuel flow.

The control system 40 also utilizes a predefined table to request the fuel valve position (i.e., a predefined minimum level) that allows the least amount of fuel into the combustion chamber 28 without causing blowout. The table's parameters include: (1) rotational speed of the drive shaft; and (2) temperature of the air entering into the engine compressor 12. By obtaining the current values of the variables through a means, such as sensors, the control system 40 can access the table and quickly determine the rate of fuel flow necessary to maintain combustion when the turbine drive shaft 18 is rotating at a particular speed and the inlet temperature is a particular temperature. The determination of the position of the fuel valve 44 can be derived from the table of minimum combustion fuel flow 36 and the valve position necessary to achieve this level of fuel flow. In a non-limiting embodiment, a table and a function are created to determine the position of the fuel valve 44. However, other methods could be used to determine fuel valve position, such as multiple tables or a single function. FIG. 5 displays an example of a two-dimensional table that can be used to determine the required rate of fuel flow to maintain combustion.

Figure 6:
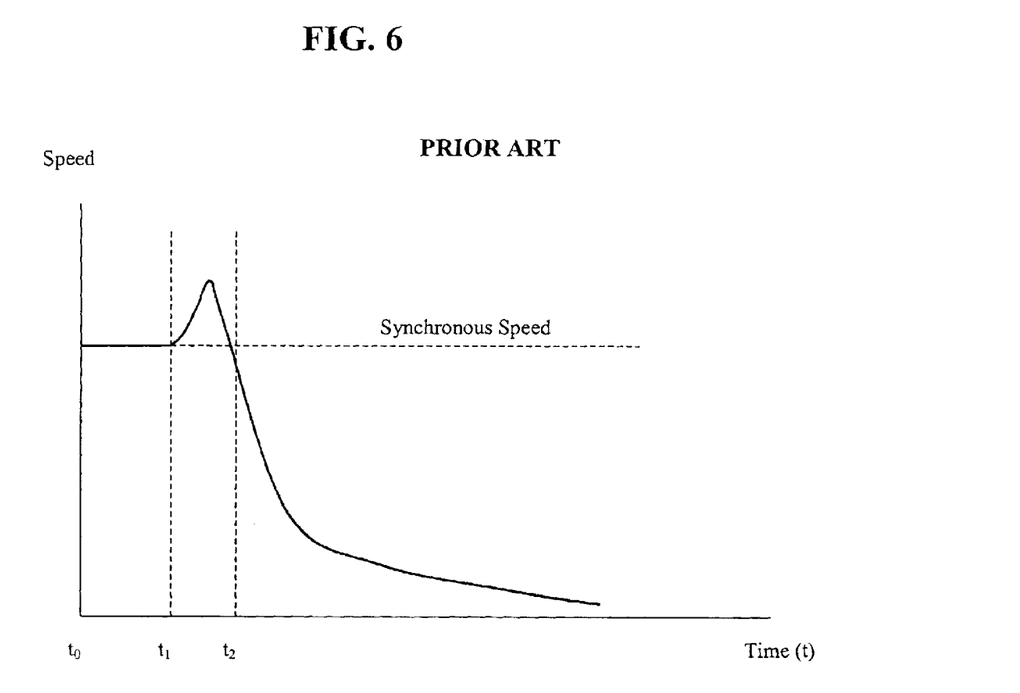
FIG. 6 is a graph of turbine drive shaft speed versus time when operating a gas turbine engine during an offload condition using a prior art method.
Figure 7:
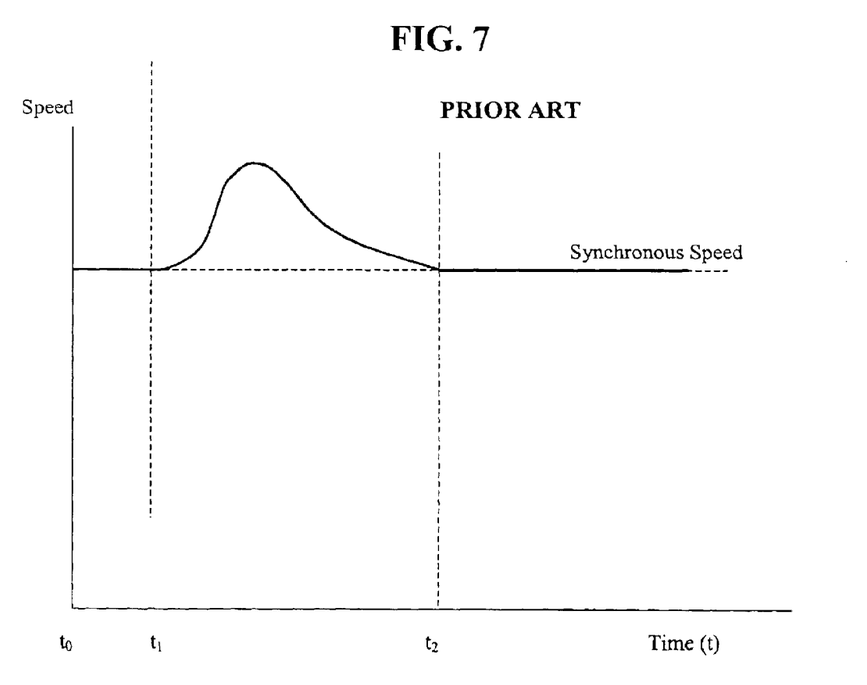
FIG. 7 is a graph of turbine drive shaft speed versus time when operating a gas turbine engine during an offload condition using a prior art method.

FIGS. 6 and 7 show graphs of turbine drive shaft speed versus time when operating the gas turbine engine 38 during an offload condition using a prior art method. Referring to both FIGS. 6 and 7, between times $t_0$ and $t_1$, the turbine drive shaft 18 is rotating at synchronous speed. At time $t_1$, a load is removed from the turbine drive shaft 18. As soon as the offload condition is sensed, the fuel valve 44 is closed to a predefined minimum level. Referring to FIG. 6, at time $t_2$, blowout occurs. The rotational speed of the turbine drive shaft 18 will eventually reach zero, and the gas turbine engine 38 will need to be restarted. Referring to FIG. 7, blowout does not occur. However, the turbine drive shaft 18 reaches greater levels of speed than the turbine drive shaft in FIG. 6. Also, it takes far too long for the turbine drive shaft 18 to return to synchronous speed, which occurs at time $t_2$. These differences are a result of the predefined minimum fuel valve position. In FIG. 6, the position of the fuel valve 44 did not allow enough fuel into the combustion chamber 28 to maintain combustion. In FIG. 7, the position of the fuel valve 44 allowed too much fuel into the combustion chamber 28, causing the turbine drive shaft 18 to rotate at higher speeds for a longer period of time.

Figure 8:
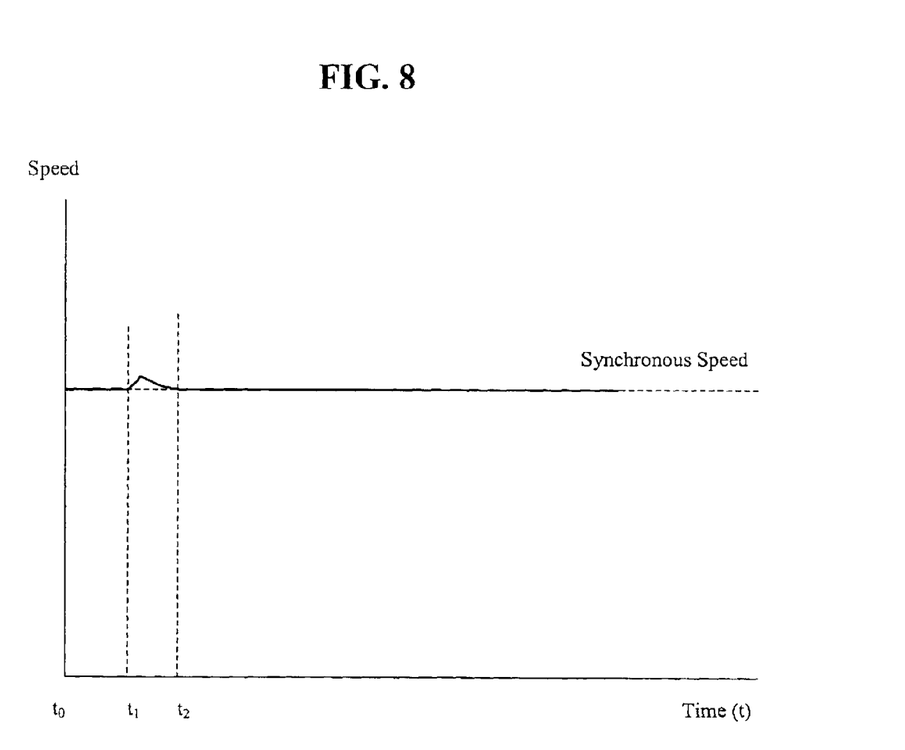
FIG. 8 is a graph of turbine drive shaft speed versus time when operating a gas turbine engine during an offload condition using the present invention.

FIG. 8 is a graph of turbine drive shaft speed versus time when operating a gas turbine engine 38 during an offload condition using the present invention. Between times $t_0$ and $t_1$, the turbine drive shaft 18 is rotating at synchronous speed. At time $t_1$, a load is removed from the turbine drive shaft 18. As soon as the offload condition is sensed, the control system 40 will close the fuel valve 44 to a level that will quickly return the speed of the turbine drive shaft 18 to synchronous speed without the risk of blowout. The speed of the turbine drive shaft 18 returns to synchronous speed at time $t_2$.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

I claim:

1. A method of operating a gas turbine engine upon the occurrence of an offload condition, the method comprising the steps of:
   a) creating a table of minimum fuel flow rates that will not cause blowout using rotational speed and inlet temperature as the table parameters;
   b) creating a function to determine a fuel valve position based on a fuel flow rate accessed from the table;
   c) defining a variance from synchronous speed;
   d) placing a load on a turbine drive shaft;
   e) accelerating the turbine drive shaft to synchronous speed;
   f) removing the load from the turbine drive shaft;
   g) detecting the removal of the load from the turbine drive shaft;
   h) enabling a control system;
   i) determining if the current speed of the turbine drive shaft is within the predefined variance;
   j) exiting the control system if the current speed is within the predefined variance;
   k) enabling a PID controller within the control system;
   l) requesting a speed for the turbine drive shaft by the control system;
   m) requesting a fuel valve position by the control system based on the requested speed through the PID controller;
   n) requesting a fuel flow rate from the table by the control system;
   o) requesting a fuel valve position through the function by the control system;
   p) positioning the fuel valve according to the fuel valve position requested through the PID controller if the requested position does not allow less fuel to the combustion chamber than the fuel valve position requested through the function;
   q) positioning the fuel valve according to the fuel valve position requested through the function if the fuel valve position requested through the PID controller allows less fuel through to the combustion chamber than the fuel valve position requested through the function;
   r) turning on an ignitor if the fuel valve position used was requested through the function;
   s) maintaining the burning of the ignitor until the fuel valve position used is requested through the PID controller;
   t) turning off the ignitor if the fuel valve position used is requested through the PID controller;
   u) maintaining the ignitor in an off position until the fuel valve position used is requested through the function; and
   v) repeating steps (i)–(u) until synchronous speed is reached.

2. A method of operating a gas turbine engine upon the occurrence of an offload condition, comprising the steps of:
   a) removing a load from a turbine drive shaft;
   b) enabling a controller within a control system to control the acceleration of the turbine drive shaft;
   c) requesting a speed for the turbine drive shaft and a fuel valve position by the control system based on the requested speed through the controller;
   d) requesting a fuel flow rate by the control system that allows the least amount of fuel into a combustion chamber of the gas turbine engine without causing blowout;
   e) requesting a fuel valve position through a function by the control system based on the requested fuel flow rate that allows the least amount of fuel into a combustion chamber of the gas turbine engine without causing blowout; and
   f) positioning the fuel valve according to the fuel valve position requested through the controller if the requested position does not allow less fuel to the combustion chamber than the fuel valve position requested through the function.

3. The method as claimed in claim 2, further comprising the step of positioning the fuel valve according to the fuel valve position requested through the function if the fuel valve position requested through the controller allows less fuel through to the combustion chamber than the fuel valve position requested through the function.

4. The method as claimed in claim 3, further comprising the step of turning on an ignitor if the fuel valve position used was requested through the function.

5. The method as claimed in claim 4, further comprising the step of maintaining burning of the ignitor until the fuel valve position used is requested through the controller.

6. The method as claimed in claim 5, further comprising the step of turning off an ignitor if the fuel valve position used is requested through the controller.

7. The method as claimed in claim 2, further comprising the step of turning off an ignitor if the fuel valve position used is requested through the controller.

8. The method as claimed in claim 6, further comprising the step of maintaining the ignitor in an off position until the fuel valve position used is requested through the function.

9. The method as claimed in claim 7, further comprising the step of maintaining the ignitor in an off position until the fuel valve position used is requested through the function.

10. The method as claimed in claim 2, further comprising the step of defining a variance from synchronous speed of the turbine drive shaft.

11. The method as claimed in claim 10, further comprising the steps of determining if a current speed of the turbine drive shaft is within the predefined variance and exiting the control system if the current speed is within the predefined variance.

12. The method as claimed in claim 2, further comprising the steps of creating a table of minimum fuel flow rates that will not cause blowout using rotational speed and inlet temperature as the table parameters and creating a function to determine a fuel valve position based on a fuel flow rate accessed from the table.

13. The method as claimed in claim 12, wherein the step of requesting a fuel flow rate is based from the table of minimum fuel flow rates.

14. The method as claimed in claim 2, further comprising the step of detecting the removal of the load from the turbine drive shaft.

15. The method as claimed in claim 2, further comprising the steps of accelerating the turbine drive shaft having a load to synchronous speed before the step of removing the load from the turbine drive shaft.

* * * * *